(12) United States Patent
Chen et al.

(10) Patent No.: US 10,151,664 B2
(45) Date of Patent: Dec. 11, 2018

(54) METHOD AND SYSTEM FOR MEASURING LENS DISTORTION

(71) Applicant: Qingdao GoerTek Technology Co.,Ltd., Qingdao (CN)

(72) Inventors: Xingyi Chen, Qingdao (CN); Jianjun Xu, Qingdao (CN); Xiliang Niu, Qingdao (CN)

(73) Assignee: Qingdao GoerTek Technology Co., Ltd., Qingdao (CN)

( * ) Notice: Subject to any disclaimer, the term of this patent is extended or adjusted under 35 U.S.C. 154(b) by 0 days.

(21) Appl. No.: 15/728,214

(22) Filed: Oct. 9, 2017

(65) Prior Publication Data
US 2018/0031442 A1 Feb. 1, 2018

Related U.S. Application Data

(63) Continuation of application No. 15/314,926, filed as application No. PCT/CN2015/082496 on Jun. 26, 2015, now Pat. No. 9,810,602.

(30) Foreign Application Priority Data

Jun. 27, 2014 (CN) .......................... 2014 1 0302056

(51) Int. Cl.
*G01M 11/02* (2006.01)

(52) U.S. Cl.
CPC .... *G01M 11/0207* (2013.01); *G01M 11/0264* (2013.01)

(58) Field of Classification Search
CPC .. G01M 11/0207; G01M 11/0264; G06T 7/80
(Continued)

(56) References Cited

U.S. PATENT DOCUMENTS 5,675,380 A * 10/1997 Florent ................... G06T 5/006
                                                                 348/247
6,002,525 A * 12/1999 Poulo ................. G01M 11/0221
                                                                 359/642
(Continued)

FOREIGN PATENT DOCUMENTS

CN          1508527 A      6/2004
CN        201476957 U      5/2010
(Continued)

OTHER PUBLICATIONS

Ding et al., "A Digital Calibration Algorithm for Wide-angle Lens Distortion", Journal of Changchun University of Science and Technology, vol. 32, Issue 2, pp. 184-188, Jun. 15, 2009.
(Continued)

*Primary Examiner* — Roy M Punnoose
(74) *Attorney, Agent, or Firm* — Moser Taboada (57) ABSTRACT

A method for measuring lens distortion, comprising: providing a test card having a dot matrix pattern of K×N dots, wherein the K and the N are both positive integer; obtaining a distorted image of the test card after being distorted by a lens; establishing a planar coordinate system for the distorted image by using a dot at an upper left corner of the distorted image as a coordinate origin, a rightward direction from the origin as a positive direction of axis X, and a downward direction from the origin as a positive direction of axis Y; positioning a center dot of the distorted image and all non-center dots by scanning and searching, and determining coordinate values of the center dot and all the non-center dots in the planar coordinate system; and calculating a distortion amount of the distorted image by using the coordinate values of the center dot and all the non-center dots according to a distortion amount calculation equation for the distorted image, thereby obtaining a distortion amount of the lens. Also disclosed is a system for measuring lens distortion. The measurement method and system accel-
(Continued)

erates the image processing speed and improves the lens distortion measurement accuracy.

16 Claims, 4 Drawing Sheets

(58) Field of Classification Search
USPC .................................................. 356/124, 127
See application file for complete search history.

(56) References Cited

U.S. PATENT DOCUMENTS

| | | | |
|---|---|---|---|
| 9,810,602 B2* | 11/2017 | Chen | .................. G01M 11/0264 |
| 2010/0276887 A1* | 11/2010 | Yoshida | ..................... A63F 1/02 |
| | | | 273/293 |
| 2011/0134254 A1* | 6/2011 | Hulsken | ............. G01M 11/0264 |
| | | | 348/187 |

FOREIGN PATENT DOCUMENTS

| | | |
|---|---|---|
| CN | 102119326 A | 7/2011 |
| CN | 102564731 A | 7/2012 |
| CN | 102845053 A | 12/2012 |
| CN | 103292981 A | 9/2013 |
| CN | 104048815 A | 9/2014 |
| JP | H08201021 A | 8/1996 |
| JP | 915098 A | 1/1997 |
| JP | 201133570 A | 2/2011 |
| KR | 20090130603 A | 12/2009 |
| WO | WO-2004092826 A1 | 10/2004 |

OTHER PUBLICATIONS

International Search Report and Written Opinion dated Sep. 30, 2015 for PCT Application No. PCT/CN2015/082496.
Chinese Office Action dated Dec. 24, 2015 for Application No. 201410302056.2.
Chinese Office Action dated Jun. 21, 2016 for Application No. 201410302056.2.
Xue Bai, et al., "Research on the Relative Distortion of Optical Sighting Telescope", Journal of Changchun University of Science and Technology (Natural Science Edition), vol. 34, No. 1, pp. 46-48, Mar. 2011.

* cited by examiner

METHOD AND SYSTEM FOR MEASURING LENS DISTORTION

CROSS-REFERENCE TO RELATED APPLICATIONS

This application is a Continuation application of U.S. patent application Ser. No. 15/314,926 filed Nov. 29, 2016, which is a national phase of PCT Application No. PCT/CN2015/082496 filed Jun. 26, 2015, which claims the benefit of Chinese Application No. 201410302056.2 filed Jun. 27, 2014, the entire contents of each of which are incorporated herein by reference.

TECHNICAL FIELD

The present disclosure relates to the technical field of image processing, and particularly, to a method and system for measuring lens distortion.

BACKGROUND

With the improvement of scientific and technological level, the consumer electronics enter people's lives at a rapid pace, and head-mounted display products attract the attention of people by virtue of the gorgeous appearances and the advanced functions. Head-mounted display products apply visual technology perfectly to display images with an LCD screen of a high resolution, and amplify the images with a lens so that the user can view clear images. In addition, the images are processed with 3D technology so that the user feels a visual impact from 3D technology. However, the images are distorted while being amplified by the lens. The distortion is a geometric distortion of imaging, and is a screen twisted deformation phenomenon caused by the different magnification powers to an image in different areas of the focal plane. The degree of the deformation progressively increases from the screen center to the screen edges, and is mainly obvious at the screen edges. Thus the distortion amount should be measured to recover the distorted image into the normal image through image processing technology. Methods for measuring lens distortion in the prior art have slow calculation speeds and low measurement accuracies, and a large error will be caused after the recovering into the normal image, which cannot satisfy requirement on image processing.

SUMMARY

The present disclosure provides a method and system for measuring lens distortion, so as to solve the problem that the existing method for measuring lens distortion has a slow calculation speed and a low measurement accuracy.

In order to achieve the above objective, the technical solutions of the present disclosure are realized as follows:

The present disclosure provides a method for measuring lens distortion, comprising:

providing a test card having a dot matrix pattern of K×N dots, wherein the K and the N are both positive integer, and the K is equal or unequal to the N;

obtaining a distorted image of the test card after being distorted by a lens;

establishing a planar coordinate system for the distorted image by using a dot at an upper left corner of the distorted image as a coordinate origin, a rightward direction from the origin as a positive direction of axis X, and a downward direction from the origin as a positive direction of axis Y;

positioning a center dot and all non-center dots of the distorted image by scanning and searching, and determining coordinate values of the center dot and all the non-center dots in the planar coordinate system; and calculating a distortion amount of the distorted image by using the coordinate values of the center dot and all the non-center dots, thereby obtaining a distortion amount of the lens.

Preferably, on the test card, the center dot has a radius larger than that of any of the non-center dots.

Preferably, the positioning a center dot and all non-center dots of the distorted image by scanning and searching comprises:

setting a square searching area centered at a coordinate of a center of the distorted image, a half of a side length of the square searching area being larger than or equal to two times of a radius of the center dot;

setting a square scanning area centered at a dot at an upper left corner of the square searching area, a half of whose side length is equal to the radius of the center dot; starting from a center of the scanning area to scan the scanning area, and calculating an average value of all pixel points in the scanning area; and in the searching area, sequently moving the center of the scanning area until the searching area is completely scanned; comparing the average values of the pixel points obtained in the scanning area each time with one another, and determining a center of a scanning area where a minimum average value or a maximum average value among all the average values of the pixel points is located as a center of the center dot; and determining in turn a coordinate value of the center of the center dot, and determining the coordinate value of the center of the center dot as the coordinate value of the center dot; and by the similar method, determining coordinate values of all the non-center dots.

Preferably, the sequently moving the center of the scanning area comprises:

in the searching area, moving the center of the scanning area from top to bottom and from left to right until the searching area is completely scanned; and the by the similar method, determining coordinate values of all the non-center dots comprises:

moving the square searching area leftwards at a specific step length with reference to the center of the center dot, to position all the non-center dots on the left and in the same row with the center dot, and determine the coordinate values of the non-center dots;

moving the square searching area rightwards at a specific step length with reference to the center of the center dot, to position all the non-center dots on the right and in the same row with the center dot, and determine the coordinate values of the non-center dots;

moving the square searching area downwards at a specific step length with reference to the center of the center dot, to position all the non-center dots in a row next to the row where the center dot is located, and determine the coordinate values of the non-center dots; and moving the square searching area upwards at a specific step length with reference to the center of the center dot, to position all the non-center dots in a row previous to the row where center dot is located, and determine the coordinate values of the non-center dots.

Preferably, the method further comprises: defining in a cache a two-dimensional array with a length at least containing all the dots, and storing coordinate information of the center dot into a center array of the two-dimensional array;

sequently storing all the positioned dots into the two-dimensional array according to relative physical positions on the distorted image, to establish index relationships of the center dot and all the non-center dots with the two-dimensional array.

Preferably, the calculating a distortion amount of the distorted image by using the coordinate values of the center dot and all the non-center dots comprises:

finding four dots A1, A2, A3 and A4 respectively located at an edge of the distorted image according to the index relationships of the center dot and all the non-center dots with the two-dimensional array, the four dots A1, A2, A3 and A4 simultaneously satisfying a condition that every two of the four dots A1, A2, A3 and A4 are located in a same reference line;

finding middle dots of the same reference lines where every two of the four dots A1, A2, A3 and A4 are located, according to index relationships of the center dot with the four dots A1, A2, A3 and A4 and all the non-center dots in the same reference lines where every two of the four dots A1, A2, A3 and A4 are located, wherein a middle dot of the reference line where the dots A1 and A2 are located is denoted as B1, a middle dot of the reference line where the dots A2 and A3 are located is denoted as B2, a middle dot of the reference line where the dots A3 and A4 are located is denoted as B3, and a middle dot of the reference line where the dots A1 and A4 are located is denoted as B4, the middle dots B1, B2, B3 and B4 simultaneously satisfying the conditions that, the dot B1, the center dot and the dot B3 are located in a same reference line;

the dot B2, the center dot and the dot B4 are located in a same reference line;

index differences of the dots A1 and A2 relative to the dot B1 are equal and denoted as m, index differences of the dots A3 and A4 relative to the dot B3 are equal and denoted as n, and m=n; and index differences of the dots A1 and A4 relative to the dot B4 are equal and denoted as u, index differences of the dots A2 and A3 relative to the dot B2 are equal and denoted as v, and v=u.

Preferably, calculating a distortion amount of the distorted image by using the coordinate values of the center dot and all the non-center dots further comprises:

calculating a distortion amount of the distorted image in a vertical direction according to the following formula:

$$\text{Vertical}=100\%*(\text{Dis}A1A4+\text{Dis}A2A3)/(2*\text{Dis}B1B3)$$

wherein, DisA1A4 denotes a distance between the dots A1 and A4, DisA2A3 denotes a distance between the dots A2 and A3, DisB1B3 denotes a distance between the dots B1 and B3, and Vertical denotes the distortion amount of the distorted image in the vertical direction; and calculating a distortion amount of the distorted image in a horizontal direction according to the following formula:

$$\text{Horizontal}=100\%*(\text{Dis}A1A2+\text{Dis}A3A4)/(2*\text{Dis}B2B4)$$

wherein, DisA1A2 denotes a distance between the dots A1 and A2, DisA3A4 denotes a distance between the dots A3 and A4, DisB2B4 denotes a distance between the dots B2 and B4, and Horizontal denotes the distortion amount of the distorted image in the horizontal direction.

Preferably, the obtaining a distorted image of the test card after being distorted by a lens comprises:

providing an industrial camera of high definition, and shooting with the industrial camera the test card through the lens when a center of the industrial camera, a center of the lens, and a center of the test card coincide, so as to obtain the distorted image.

Preferably, when the center dot and the non-center dots are black dots, determining the center of the scanning area where the minimum average value among all the average values of the pixel points is located as a center of the center black dot, and determining the coordinate value of the center of the center black dot.

The present disclosure further provides a system for measuring lens distortion, wherein the above method is applied to measure the lens distortion, the system comprising:

a test card having a dot matrix pattern of K×N dots;

an imaging device configured to obtain a distorted image of the test card after being distorted by a lens; and an image processing device configured to establish a planar coordinate system for the distorted image by using a dot at an upper left corner of the distorted image as a coordinate origin, a rightward direction from the origin as a positive direction of axis X, and a downward direction from the origin as a positive direction of axis Y; position a center dot and all non-center dots of the distorted image by scanning and searching, and determine coordinate values of the center dot and all the non-center dots in the planar coordinate system; and calculate a distortion amount of the distorted image by using the coordinate values of the center dot and all the non-center dots, thereby obtaining a distortion amount of the lens.

The method and system for measuring lens distortion provided by the present disclosure can quickly and accurately position all the dots on the test card, and the actual error range reaches the sub pixel level, thereby achieving the purpose of rapidly calculating the distortion amount of the distorted image and really reflecting the distortion of the lens.

Other features and advantages of the application will be elaborated in the subsequent description, and they are partially apparent from the description or understood by implementing the application. The objectives and other advantages of the application can be realized and obtained by the structures particularly pointed out in the description, claims and drawings.

BRIEF DESCRIPTION OF THE DRAWINGS

The drawings are provided for a further understanding of the present disclosure, and constitute part of the specification. The drawings are used together with the embodiments of the present disclosure to explain the present disclosure, rather than making any limitation to the present disclosure. In the figures.

DETAILED DESCRIPTION

In order that the objectives, technical solutions and advantages of the present disclosure are clearer, the embodiments of the present disclosure will be further described in details as follows with reference to the drawings.

The core idea of the present disclosure is to use a new distorted image test card provided with black dots which form a dot matrix pattern, perform coordinate positioning based on the test card to quickly recognize the coordinates of all the black dots of the distorted image, and calculate the distortion amount of the distorted image according to the coordinates of all the black dots. The measurement method of the present disclosure can quickly find the black dots on the test card, accelerate the processing speed of the distortion amount measurement, and improve the measurement accuracy.

Figure 1:
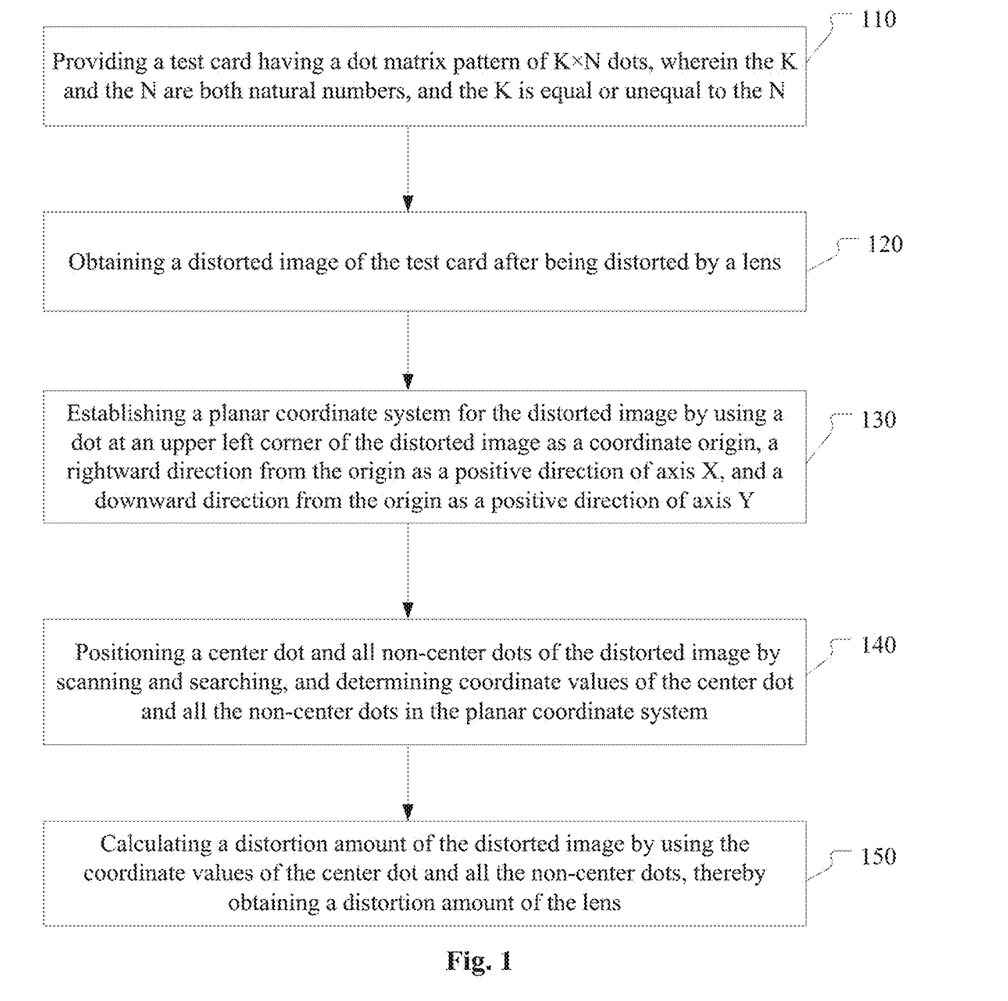
FIG. 1 is a flow diagram of a method for measuring lens distortion provided by an embodiment of the present disclosure.

FIG. 1 is a flow diagram of a method for measuring lens distortion provided by an embodiment of the present disclosure. Referring to FIG. 1, the method comprises:

step S110: providing a test card having a dot matrix pattern of K×N dots, wherein the K and the N are both positive integer, and the K is equal or unequal to the N;

step S120: obtaining a distorted image of the test card after being distorted by a lens;

step S130: establishing a planar coordinate system for the distorted image by using a dot at an upper left corner of the distorted image as a coordinate origin, a rightward direction from the origin as a positive direction of axis X, and a downward direction from the origin as a positive direction of axis Y;

step S140: positioning a center dot and all non-center dots of the distorted image by scanning and searching, and determining coordinate values of the center dot and all the non-center dots in the planar coordinate system;

step S150: calculating a distortion amount of the distorted image by using the coordinate values of the center dot and all the non-center dots, thereby obtaining a distortion amount of the lens.

By constructing the planar coordinate system of the distorted image, all the dots in the distorted image are quickly recognized, and the coordinate values of all the dots on the distorted image are calculated. The measurement method requires a small calculation amount, thereby increasing the distorted image measurement speed. Meanwhile, the test card using the dot matrix pattern of K×N dots ensures the improvement of the measurement accuracy.

Figure 2:
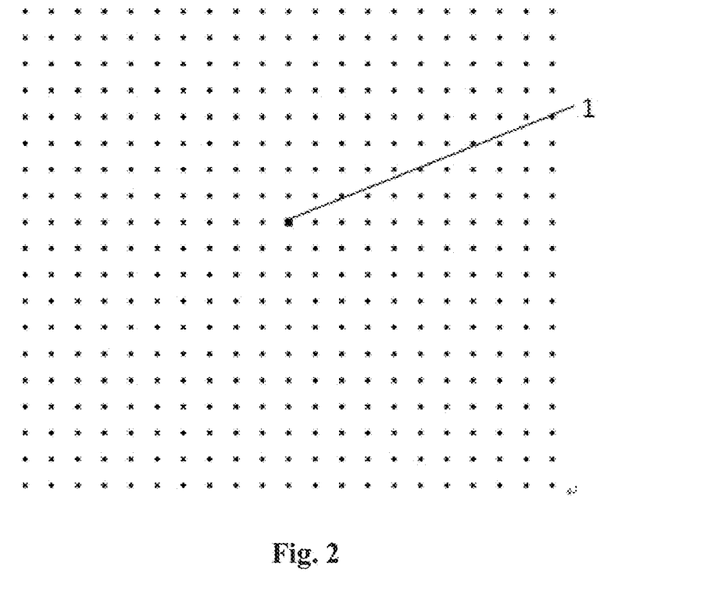
FIG. 2 is a schematic diagram of a test card provided by an embodiment of the present disclosure.

FIG. 2 is a schematic diagram of a test card provided by an embodiment of the present disclosure. Referring to FIG. 2, which locally displays the test card used in this embodiment: a square matrix of 21 rows and 21 columns of black dots, wherein 1 denotes a center black dot of the square matrix, and the center black dot has a radius larger than that of any of the non-center black dots, so as to be aligned with the camera center when the distorted image is shot. In addition, the larger radius of the center black dot facilities the recognition of the center dot when calculation processing is performed by using the image processing technology. It can be understood that FIG. 2 only illustrates a middle part of the distorted image of the test card shot by the lens taken in this embodiment. Since the lens causes the distortion of the test card, the edge portion of the distorted image has a nearly circular shape, while the middle part is approximately a matrix arrangement.

Figure 3:
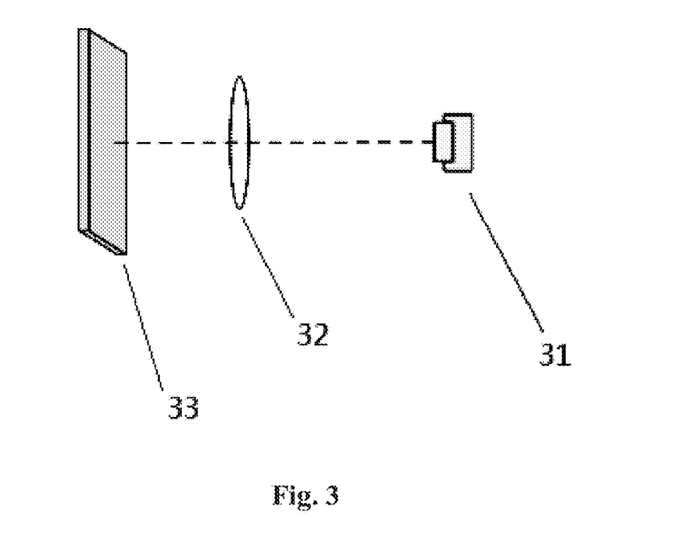
FIG. 3 is a schematic diagram for acquiring a distorted image provided by an embodiment of the present disclosure.

When the head-mounted display product and other similar smart display product display an image with an LCD screen of a high resolution, a magnification shall be made with a lens so that the user can view a clear image. But the image will be distorted when being magnified by the lens. The method of the present disclosure is to measure a distortion amount of a distorted image, and the distorted image should be acquired before the measurement. FIG. 3 is a schematic diagram for acquiring a distorted image provided by an embodiment of the present disclosure. Referring to FIG. 3, a high-pixel (e.g., 10 megapixels) industrial camera 31 shoots a test card placed on an LCD screen 33 of the head-mounted display product through a lens 32, and makes the center of the picture of the test card coincide with the center of the camera 31 and the center of the lens 32. In that case, the shot distorted image can accurately indicate the distortion amount of the image caused by the lens.

Figure 4:
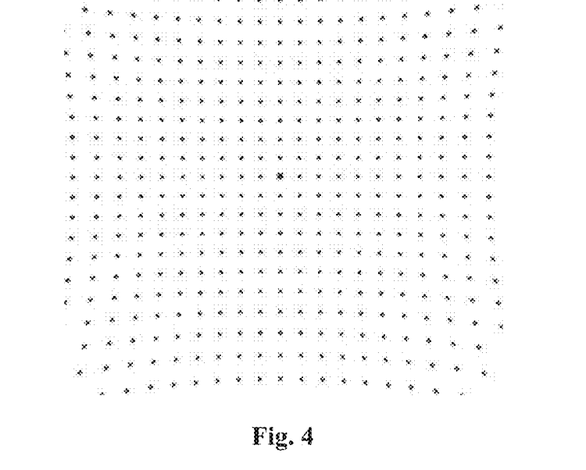
FIG. 4 is a schematic diagram of a distorted image of a test card after being distorted by a lens provided by an embodiment of the present disclosure.

FIG. 4 is a schematic diagram of a distorted image of a test card after being distorted by a lens provided by an embodiment of the present disclosure. FIG. 4 can best reflect the proper area for calculating lens distortion, wherein the dots on the four corners at the edge are close to the image edge so far as possible, and every two dots are located in a same reference line outermost and most complete at the edge; generally they form an F×F dot matrix area, and F is an odd number. Referring to FIG. 4, the test card is pillow-distorted while being magnified by the lens, thus the positions of the black dots on the test card are offset by the distortion, and the offset position of each black dot is different from each other, wherein the black dots at the edge positions on the periphery of the distorted image have the largest distortion degree. The present disclosure determines coordinate values of all the black dots on the distorted image by means of coordinate positioning. On the distorted image of the test card after being distorted by the lens, the relative physical positions of the center dot and other non-center dots are unchanged, and the specific coordinate values may be changed. The coordinates of all the black dots are positioned by using the coordinate positioning technology. Since the relative physical positions of the black dots are unchanged and the actual coordinate values are changed, the distortion amount of the distorted image is obtained by using the changed coordinate values of all the black dots and a distortion amount calculation formula, thereby obtaining a distortion amount of the lens, so as to adjust the distorted image to reduce the error when being recovered into the normal image.

Figure 5:
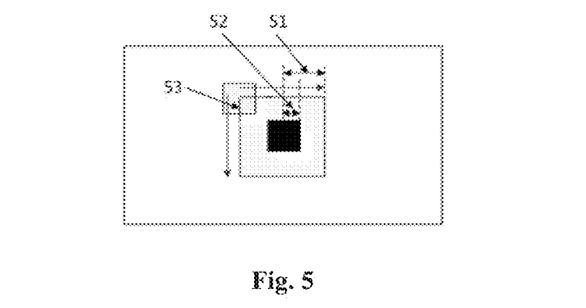
FIG. 5 is a model diagram for positioning black dots in a distorted image provided by an embodiment of the present disclosure.
Figure 6:
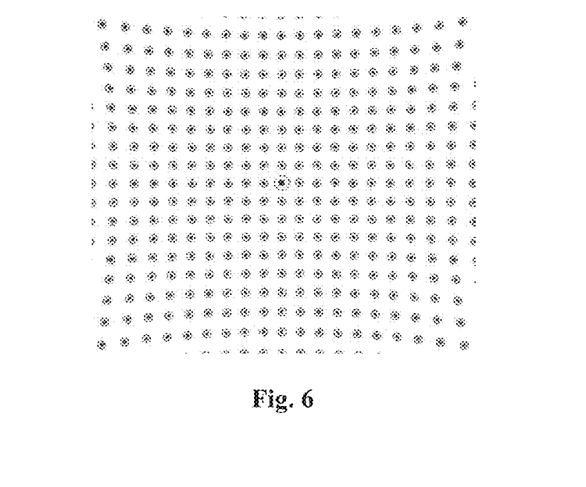
FIG. 6 is a physical diagram of all positioned black dots provided by an embodiment of the present disclosure.

Next, the positioning of all the black dots of the distorted image will be described with reference to FIGS. 5 and 6. FIG. 5 is a model diagram for positioning black dots in a distorted image provided by an embodiment of the present disclosure. FIG. 6 is a physical diagram of all positioned black dots provided by an embodiment of the present disclosure.

The method of positioning a center dot and all non-center dots of the distorted image by scanning and searching is specifically to set a square searching area centered at a coordinate of the center of the distorted image, a half of a side length of the square searching area being larger than or equal to two times of a radius of the center dot; set a square scanning area centered at a dot at the upper left corner of the square searching area, a half of whose side length is equal to the radius of the center dot; start from a center of the scanning area to scan the image in the scanning area and calculate an average value of all pixel points of the images in the scanning area; in the searching area, sequently move the center of the scanning area until the searching area is completely scanned; compare the average values of the pixel points obtained in the scanning area each time with one another, and determine a center of a scanning area where a minimum average value or a maximum average value among all the average values of the pixel points is located as a center of the center dot; determine the coordinate value of the center of the center dot, and determine the coordinate value of the center of the center dot as the coordinate value of the center dot; and by the similar method, determine coordinate values of all the non-center dots.

Referring to FIG. 5, in this embodiment, the center dot and the non-center dots on the test card are black dots. In the black area where the center black dot shown in FIG. 5 is located, a square searching area is defined with the radius 51 equal to or larger than two times of the radius 52 of the black dot, and a square scanning area centered at a dot at the upper left corner of the searching area is defined with the radius 53 equal to the radius of the black dot. In the searching area with the larger radius, the center of the scanning area is sequently moved for scanning from top to bottom and from left to right; the average value of all the pixel points in the scanning area is recorded each time a scanning is carried out, until the searching area is completely scanned; and the average value of the pixel points obtained in the scanning area each time is compared with one another, the center of the scanning area where the minimum average value is located is determined as the center of the center black dot to complete the positioning of the center black dot, and the coordinate value of the center black dot is calculated and saved. It can be understood that when the method of the present disclosure is applied, the color of the dots on the test card is not limited to black. Thus, when the dots on the test card are to be positioned, the center of a scanning area where the average value is the minimum or the maximum shall be selected as the center of the center dot, according to the pixel values of the specific color of the dots. In this embodiment, the dots on the test card are black, and thus the pixel value decreases when the scanning area contains more black parts, and the pixel value of absolute black is 0. In other embodiments of the present disclosure, the ground color of the test card may be other colors. In the event that the center dot and the non-center dots are for example white, when a positioning is to be made with the scanning areas, the center of the scanning area where a maximum average value (the pixel value of white color is 255) among the average values of the pixel points of the scanning areas is located will be positioned as the center of the center dot.

All the non-center black dots are positioned by a method similar to that of positioning the center black dot, comprising: moving the square searching area leftwards at a specific step length with reference to the center of the center black dot, to position all the non-center black dots on the left and in the same row with the center black dot, and determining the coordinate values of the non-center black dots; moving the square searching area rightwards at a specific step length with reference to the center of the center black dot to position all the non-center black dots on the right and in the same row with the center black dot, and determining the coordinate values of the non-center black dots; moving the square searching area downwards at a specific step length with reference to the center of the center black dot, to position all the non-center black dots in the row next to the row where the center black dot is located, and determining the coordinate values of the non-center black dots; and moving the square searching area upwards at a specific step length with reference to the center of the center black dot, to position all the non-center black dots in the row previous to the row where the center black dot is located, and determining the coordinate values of the non-center black dots.

When the non-center black dot is positioned, the radius of the selected square searching area is two times of that of the non-center black dot or more. When the searching area is moved, the specific step length is the distance between every two black dot centers on the distorted image, and it is a preset empirical value, wherein a moving each time by the specific step length can avoid unnecessary scanning, thereby improving the scanning speed and efficiency of the scanning area.

FIG. 6 is a physical diagram of all positioned black dots provided by an embodiment of the present disclosure. Referring to FIG. 6, after being positioned, the center black dot and all the non-center black dots are marked with circles. Through the above steps, the coordinate values of the center black dot and the non-center black dots are determined and saved.

Figure 7:
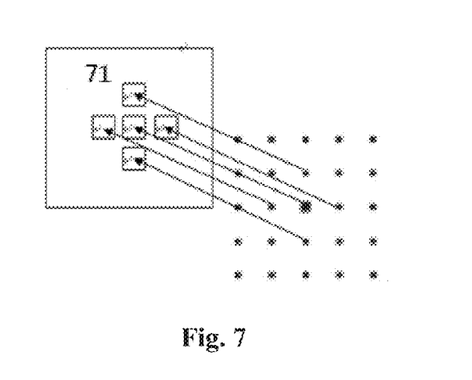
FIG. 7 is a schematic diagram of black dot coordinate caches provided by an embodiment of the present disclosure.

As for saving the coordinate values, an embodiment of the present disclosure stores the coordinate values in the manner of a two-dimensional array. FIG. 7 is a schematic diagram of black dot coordinate caches provided by an embodiment of the present disclosure. Referring to FIG. 7, several dots on the distorted image are exemplarily selected, and the coordinate values of the selected dots are saved at relative physical positions on the distorted image. Firstly, the mode defines in a cache a two-dimensional array with a length at least containing all the dots. Two-dimensional arrays of different lengths are provided according to different application scenes and different numbers of the black dots on the distorted image. For example in this embodiment, a two-dimensional array "array[41][41]" with the length of 41 is defined. After that, the coordinate value of the center black dot is stored, and during the storing the middlemost position "array[21][21]" is found; the coordinate value of the center black dot is placed into the array "array[21][21]", the coordinate value of the black dot on the left and in the same row with the center black dot of the distorted image is placed into the "array[20][21]", and in the same manner, the coordinate values of other black dots on the distorted image are placed into the two-dimensional array to establish the index relationships between the black dots on the distorted image and the two-dimensional array.

Figure 8:
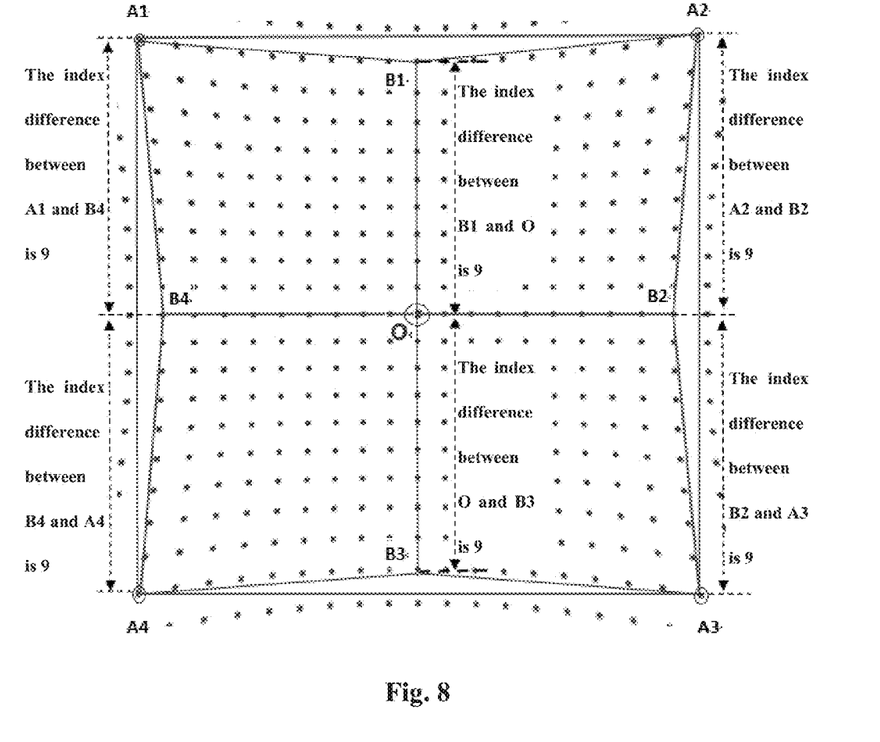
FIG. 8 is a reference diagram for calculating a distortion amount of a distorted image provided by an embodiment of the present disclosure.

FIG. 8 is a reference diagram for calculating a distortion amount of a distorted image provided by an embodiment of the present disclosure. Referring to FIG. 8, after the coordinate values of all the black dots are obtained, the distorted image is observed to select several key dots thereon which can best reflect the distortion degrees. Referring to FIG. 8, a two-dimensional array in the cache is quickly searched to find four dots A1, A2, A3 and A4 which can best reflect the calculation of lens distortion, and the four dots should be close to the edges of the distorted image as much as possible, i.e., the area defined by the four dots A1, A2, A3 and A4 can best reflect an area suitable for the calculation of lens distortion. Every two of the four dots A1, A2, A3 and A4 are located in a same reference line outermost and most complete at the edge to define a selected tail end of the reference line, while satisfying the following conditions:

Every two of the four dots A1, A2, A3 and A4 are located in a same reference line. The cross dot of the line connecting the dots A1 and A2 and the vertical reference line where the center dot is located is denoted as B1, and the cross dot of the line connecting the dots A2 and A3 and the horizontal reference line where the center dot is located is denoted as B2. Similarly, dots B3 and B4 are determined. The index differences of the dots A1 and A2 relative to the dot B1 are equal and denoted as m, the index differences of the dots A3 and A4 relative to the dot B3 are equal and denoted as n, m=n=9, and the three dots B1, O (the center black dot) and B3 are located in the same reference line. Similarly, the index differences of the dots A1 and A4 relative to the dot B4 are equal and denoted as u, the index differences of the dots A2 and A3 relative to the dot B2 are equal and denoted as v, v=u=9, and the three dots B2, O (the center black dot) and B4 are located in the same reference line. The index difference of 9 indicates that the center black dot O is spaced from the dot B1 by 9 black dots. In practice, B1, B2, B3 and B4 may be deemed as the middle dots (or middle dots) of the same reference lines where every two of the four dots A1, A2, A3 and A4 are located, respectively. That is, the center dot of the reference line where the dots A1 and A2 are located is B1, the center dot of the reference line where the dots A2 and A3 are located is B2, the center dot of the reference line where the dots A3 and A4 are located is B3, and the center dot of the reference line where the dots A1 and A4 are located is B4.

After the coordinate values of the above key dots A1-A4 and B1-B4 are obtained, calculations will be performed according to the distortion amount calculation formulas:

A distortion amount of the distorted image in a horizontal direction is calculated according to the following formula:

$$\text{Horizontal} = 100\% \ast (\text{Dis}A1A2 + \text{Dis}A3A4)/(2 \ast \text{Dis}B2B4)$$

wherein, DisA1A2 denotes a distance between the dots A1 and A2, DisA3A4 denotes a distance between the dots A3 and A4, DisB2B4 denotes a distance between the dots B2 and B4, and Horizontal denotes the distortion amount of the distorted image in the horizontal direction.

Similarly, a distortion amount of the distorted image in a vertical direction is calculated according to the following formula:

$$\text{Vertical} = 100\% \ast (\text{Dis}A1A4 + \text{Dis}A2A3)/(2 \ast \text{Dis}B1B3)$$

wherein, DisA1A4 denotes a distance between the dots A1 and A4, DisA2A3 denotes a distance between the dots A2 and A3, DisB1B3 denotes a distance between the dots B1 and B3, and Vertical denotes the distortion amount of the distorted image in the vertical direction.

The distortion amount of the distorted image can be obtained after the calculations of the distortion amounts of the distorted image in the horizontal direction and the vertical direction, thereby obtaining a distortion amount of the lens, and then the distorted image is adjusted to better recover the image and reduce error.

An embodiment of the present disclosure further provides a system for measuring lens distortion, which applies the method as illustrated in FIG. 1 to measure the lens distortion, and the system comprises:

a test card having a dot matrix pattern of K×N dots;

an imaging device configured to obtain a distorted image of the test card after being distorted by a lens; and an image processing device configured to establish a planar coordinate system for the distorted image by using a dot at an upper left corner of the distorted image as a coordinate origin, a rightward direction from the origin as a positive direction of axis X, and a downward direction from the origin as a positive direction of axis Y; position a center dot and all non-center dots of the distorted image by scanning and searching, and determine coordinate values of the center dot and all the non-center dots in the planar coordinate system; and calculate a distortion amount of the distorted image by using the coordinate values of the center dot and all the non-center dots, thereby obtaining a distortion amount of the lens.

In conclusion, the method and system for measuring lens distortion in the present disclosure defines a new planar coordinate system based on the distorted image, quickly and accurately finds the dots on the test card by coordinate positioning, and improves the image processing speed and efficiency. The error range reaches the sub pixel level, and the measurement accuracy is improved. In addition, the coordinate information of the dots on the image is stored in the cache array, which facilitates the quick search for the coordinates of the dots on the image, and the calculation of the distortion amount of the distorted image, thereby more really reflecting the lens distortion degree.

The above descriptions are just preferred embodiments of the present disclosure, rather than limitations to the protection scope of the present disclosure. Any amendment, equivalent replacement, improvement, etc. made within the spirit and principle of the present disclosure fall within the protection scope of the present disclosure.

The invention claimed is:

1. A method for measuring lens distortion, comprising:
    when an imaging device and a test card are individually located on two sides of a lens, obtaining a distorted image of the test card by using the imaging device, wherein the test card has a plurality of dots;
    establishing a planar coordinate system for the distorted image;
    positioning dots of the distorted image by scanning and searching, and determining coordinate values of the dots in the planar coordinate system; and
    calculating a distortion amount of the distorted image by using the coordinate values of the dots, thereby obtaining a distortion amount of the lens;
    wherein, the establishing a planar coordinate system for the distorted image comprises:
    establishing a planar coordinate system for the distorted image by using a dot at an upper left corner of the distorted image as a coordinate origin, a rightward direction from the origin as a positive direction of axis x, and a downward direction from the origin as a positive direction of axis y;
    wherein, the positioning dots of the distorted image by scanning and searching, and determining coordinate values of the dots in the planar coordinate system comprises:
    on the basis of the unchanged relation of relative physical positions of a center dot and all non-center dots, by coordinate positioning, positioning the center dot and all the non-center dots of the distorted image by scanning and searching, and determining coordinate values of the center dot and all the non-center dots in the planar coordinate system;
    the method further comprising:
    defining in a cache a two-dimensional array with a length at least containing all the dots, and storing coordinate information of the center dot into a center array of the two-dimensional array; and
    sequentially storing all the positioned dots into the two-dimensional array according to relative physical positions on the distorted image, to establish index relationships of the center dot and all the non-center dots with the two-dimensional array;

wherein, the calculating a distortion amount of the distorted image by using the coordinate values of the dots comprises:
finding a plurality of key dots that meet a preset rule in the distorted image according to the index relationships of the center dot and all the non-center dots with the two-dimensional array; and
calculating the distortion amount of the distorted image according to distances between the plurality of key dots, wherein the distortion amount of the distorted image comprises a distortion amount in a vertical direction and/or a distortion amount in a horizontal direction.

2. The method according to claim 1, wherein, the test card has a dot matrix pattern of K×N dots, wherein the K and the N are both positive integer, and the K is equal or unequal to the N.

3. The method according to claim 1, wherein, on the test card, the center dot has a radius larger than that of any of the non-center dots.

4. The method according to claim 3, wherein the positioning a center dot of the distorted image by scanning and searching comprises:
setting a square searching area centered at a coordinate of a center of the distorted image, a half of a side length of the square searching area being larger than or equal to two times of a radius of the center dot;
setting a square scanning area centered at a dot at an upper left corner of the square searching area, a half of whose side length is equal to the radius of the center dot; starting from a center of the scanning area to scan the scanning area, and calculating an average value of all pixel points in the scanning area;
in the searching area, according to an order from top to bottom and from left to right moving the center of the scanning area until the searching area is completely scanned; comparing the average values of the pixel points obtained in the scanning area each time with one another, and determining a center of a scanning area where a minimum average value or a maximum average value among all the average values of the pixel points is located as a center of the center dot; and determining in turn a coordinate value of the center of the center dot, and determining the coordinate value of the center of the center dot as the coordinate value of the center dot.

5. The method according to claim 4, wherein, the positioning all non-center dots of the distorted image by scanning and searching comprises:
moving the square searching area leftwards at a specific step length with reference to the center of the center dot, to position all the non-center dots on the left and in the same row with the center dot, and determine the coordinate values of the non-center dots;
moving the square searching area rightwards at a specific step length with reference to the center of the center dot, to position all the non-center dots on the right and in the same row with the center dot, and determine the coordinate values of the non-center dots;
moving the square searching area downwards at a specific step length with reference to the center of the center dot, to position all the non-center dots in a row next to the row where the center dot is located, and determine the coordinate values of the non-center dots; and
moving the square searching area upwards at a specific step length with reference to the center of the center dot, to position all the non-center dots in a row previous to the row where center dot is located, and determine the coordinate values of the non-center dots; and
in the searching area, moving the center of the scanning area from top to bottom and from left to right until the searching area is completely scanned.

6. The method according to claim 5, wherein, the specific step length is a distance between each two dot centers in the distorted image.

7. The method of claim 4, wherein, when the center dot and the non-center dots are black dots, determining the center of the scanning area where the minimum average value among all the average values of the pixel points is located as a center of center black dot, and determining the coordinate value of the center of the center black dot.

8. The method according to claim 4, wherein, when the center dot and the non-center dots are white dots, determining the center of the scanning area where the maximum average value among all the average values of the pixel points is located as a center of center white dot, and determining the coordinate value of the center of the center white dot.

9. The method according to claim 1, wherein, the finding a plurality of key dots that meet a preset rule in the distorted image according to the index relationships of the center dot and all the non-center dots with the two-dimensional array comprises:
finding four key dots A1, A2, A3 and A4 respectively located at an edge of the distorted image according to the index relationships of the center dot and all the non-center dots with the two-dimensional array, the four key dots A1, A2, A3 and A4 simultaneously satisfying a condition that every two of the four key dots A1, A2, A3 and A4 are located in a same reference line at the edge of the distorted image;
finding middle dots of the same reference lines where every two of the four key dots A1, A2, A3 and A4 are located, according to index relationships of the center dot with the four key dots A1, A2, A3 and A4 and all the non-center dots in the same reference lines where every two of the four key dots A1, A2, A3 and A4 are located, wherein an middle dot of the reference line where the key dots A1 and A2 are located is denoted as B1, a middle dot of the reference line where the key dots A2 and A3 are located is denoted as B2, a middle dot of the reference line where the key dots A3 and A4 are located is denoted as B3, and a middle dot of the reference line where the key dots A1 and A4 are located is denoted as B4, the middle dots B1, B2, B3 and B4 simultaneously satisfying the conditions that,
the dot B1, the center dot and the dot B3 are located in a same reference line;
the dot B2, the center dot and the dot B4 are located in a same reference line;
index differences of the key dots A1 and A2 relative to the dot B1 are equal and denoted as m, index differences of the key dots A3 and A4 relative to the dot B3 are equal and denoted as n, and m=n; and
index differences of the key dots A1 and A4 relative to the dot B4 are equal and denoted as u, index differences of the key dots A2 and A3 relative to the dot B2 are equal and denoted as v, and v=u.

10. The method according to claim 1, wherein the according to distances between the plurality of key dots calculating the distortion amount of the distorted image comprises:

calculating a distortion amount of the distorted image in a vertical direction according to the following formula:

$$\text{Vertical}=100\%*(\text{Dis}A1A4+\text{Dis}A2A3)/(2*\text{Dis}B1B3)$$

wherein, DisA1A4 denotes a distance between the key dots A1 and A4, DisA2A3 denotes a distance between the key dots A2 and A3, DisB1B3 denotes a distance between the key dots B1 and B3, and Vertical denotes the distortion amount of the distorted image in the vertical direction; and calculating a distortion amount of the distorted image in a horizontal direction according to the following formula:

$$\text{Horizontal}=100\%*(\text{Dis}A1A2+\text{Dis}A3A4)/(2*\text{Dis}B2B4)$$

wherein, DisA1A2 denotes a distance between the key dots A1 and A2, DisA3A4 denotes a distance between the key dots A3 and A4, DisB2B4 denotes a distance between the key dots B2 and B4, and Horizontal denotes the distortion amount of the distorted image in the horizontal direction.

11. The method according to claim 1, wherein the imaging device is an industrial camera, the obtaining a distorted image of the test card by using the imaging device comprises: shooting with the industrial camera the test card when a center of the industrial camera, a center of the lens, and a center of the test card coincide, so as to obtain the distorted image.

12. A system for measuring lens distortion, wherein the method according to claim 1 is applied to measure the lens distortion, wherein the system comprises an imaging device, a lens, a test card and an image processing device, and the imaging device and the test card are individually located on two sides of the lens; wherein: the test card has a plurality of dots; the imaging device is configured to obtain a distorted image of the test card; and the image processing device is configured to establish a planar coordinate system for the distorted image; position dots of the distorted image by scanning and searching, and determine coordinate values of the dots in the planar coordinate system; and calculate a distortion amount of the distorted image by using the coordinate values of the dots, thereby obtaining a distortion amount of the lens.

13. The system according to claim 12, wherein, the planar coordinate system for the distorted image is established by using a dot at an upper left corner of the distorted image as a coordinate origin, a rightward direction from the origin as a positive direction of axis x, and a downward direction from the origin as a positive direction of axis y.

14. The system according to claim 12, wherein, the test card has a dot matrix pattern of K×N dots, wherein the K and the N are both positive integer, and the K is equal or unequal to the N.

15. The system according to claim 14, wherein, on the test card, the center dot has a radius larger than that of any of the non-center dots.

16. The system according to claim 14, wherein, a center of the dot matrix pattern of the test card, a center of the imaging device and a center of the lens coincide.

* * * * *